(12) United States Patent
Buerkert et al.

(10) Patent No.: US 11,962,218 B2
(45) Date of Patent: Apr. 16, 2024

(54) ELECTRICAL MACHINE WITH GROUNDED SHIELD ARRANGEMENT

(71) Applicant: EBM-PAPST MULFINGEN GMBH & CO. KG, Mulfingen (DE)

(72) Inventors: Martin Buerkert, Doerzbach-Hohebach (DE); Rainer Mueller, Zweiflingen-Pfahlbach (DE); Jochen Haefner, Blaufelden (DE); Sebastian Schroth, Kupferzell (DE)

(73) Assignee: EBM-PAPST MULFINGEN GMBH & CO. KG, Mulfingen (DE)

( * ) Notice: Subject to any disclaimer, the term of this patent is extended or adjusted under 35 U.S.C. 154(b) by 0 days.

(21) Appl. No.: 17/669,974

(22) Filed: Feb. 11, 2022

(65) Prior Publication Data
US 2022/0255394 A1 Aug. 11, 2022

(30) Foreign Application Priority Data
Feb. 11, 2021 (DE) .......................... 102021103277.6

(51) Int. Cl.
| H02K 5/173 | (2006.01) |
| H02K 11/01 | (2016.01) |
| H02K 11/40 | (2016.01) |

(52) U.S. Cl.
CPC ....... *H02K 5/1732* (2013.01); *H02K 11/0141* (2020.08); *H02K 11/40* (2016.01)

(58) Field of Classification Search
CPC .. H02K 5/1732; H02K 11/0141; H02K 11/40; H02K 11/014
See application file for complete search history.

(56) References Cited

U.S. PATENT DOCUMENTS

| 3,701,911 A | * | 10/1972 | Hallerback | .............. | H02K 5/15 310/90 |
| 7,113,365 B1 | * | 9/2006 | Ryan | ...................... | H02K 1/146 360/99.08 |

(Continued)

FOREIGN PATENT DOCUMENTS

| EP | 2546958 A1 | 1/2013 |
| JP | 2000299959 A | 10/2000 |

(Continued)

OTHER PUBLICATIONS

FR 3111484 ; Elmahdi et al.; Dec. 17, 2021 (Year: 2021).*

(Continued)

*Primary Examiner* — Ahmed Elnakib
(74) *Attorney, Agent, or Firm* — CANTOR COLBURN LLP

(57) ABSTRACT

An electrical machine including a stator, a rotor and a bearing arrangement having a first bearing and a second bearing on opposite sides of the stator as well as a shielding arrangement comprising a first shielding unit and a second shielding unit. The rotor is rotatably supported around a rotation axis by means of bearings. The shielding units are electrically conductive and comprise a ring part in each case that extends originating from a radial inner end to a radial outer end away from the rotation axis. Preferably each shielding unit has a circumferential part on its radial outer end that extends in a continuous ring-shaped manner around rotation axis and is arranged in overlapping manner with the adjacent axial end of stator winding in axial direction. The circumferential parts are preferably completely closed, whereas the ring parts can comprise through holes.

22 Claims, 5 Drawing Sheets

(56) References Cited

U.S. PATENT DOCUMENTS

| | | | |
|---|---|---|---|
| 2008/0238230 A1 | 10/2008 | Mochida et al. | |
| 2017/0126091 A1* | 5/2017 | Capoulun | H02K 21/22 |
| 2018/0159390 A1 | 6/2018 | Guigou et al. | |
| 2018/0298908 A1 | 10/2018 | Capoulun et al. | |
| 2020/0177048 A1* | 6/2020 | Schroth | H02K 5/1732 |
| 2022/0255394 A1* | 8/2022 | Buerkert | H02K 11/0141 |
| 2022/0271600 A1* | 8/2022 | Kamizato | H02K 15/0056 |

FOREIGN PATENT DOCUMENTS

| | | | |
|---|---|---|---|
| JP | 2008263698 A | 10/2008 | |
| WO | 2019030181 A1 | 2/2019 | |

OTHER PUBLICATIONS

EP 3125413 (Year: 2017).*
The European Patent Office issued an extended Search Report for EP Application No. 22153940.6; dated Aug. 1, 2022.(9 pages).
Ferreira, F. et al. "Evaluation of Slot-Embedded Partial Electrostatic Shield for High-Frequency Bearing Current Mitigation in Inverter-Fed Induction Motors", IEEE Transactions on Energy Conversion, vol. 27, No. 2, Jun. 2012, 9 Pages.
Vostrov, K. et al. "Shielding the end windings to reduce bearing currents", 2020 International Conference on Electrical Machines (ICEM), Gothenburg, 2020, pp. 1431-1437, doi: 10.1109/ICEM49940.2020.9270673.
Search Report for corresponding DE Application No. 102021103277.6; Mailing Date, Dec. 17, 2021 (28 pages).

* cited by examiner

ELECTRICAL MACHINE WITH GROUNDED SHIELD ARRANGEMENT

CROSS REFERENCE TO RELATED APPLICATIONS

This application claims priority under 35 U.S.C. § 119 to the following German Patent Application No. 10 2021 103 277.6, filed on Feb. 11, 2021, the entire contents of which are incorporated herein by reference thereto.

TECHNICAL FIELD

The invention refers to an electrical machine comprising a stator, a rotor rotatable around a rotation axis and a bearing assembly for supporting the rotor.

BACKGROUND

The electrical machine is particularly an electrical machine that can be operated with alternating current and preferably with 3-phase alternating current, e.g. a synchronous machine or asynchronous machine.

In the motor operation the electrical machine operates with an electromagnetic rotating field that is created by means of a stator winding and serves to move the rotor. For example, the rotor can have permanent magnets. The electrical machine is not directly operated by one or more phases of the power grid, but a converter is connected between the power grid and the electrical machine, e.g. a frequency converter. If the electrical machine is connected to a converter that comprises a direct current link, a timely varying common mode voltage can be created between the stator winding and a reference potential (e.g. ground or earth). Due to this common mode voltage, parasitic capacitances may become effective in the electrical machine that can then be responsible for increased wear or damages. For example, breakthroughs or light arcs can occur in the region of the bearing arrangement due to a parasitic capacitance and depending on the amount of the common mode voltage, whereby the bearing as well as also the lubricant provided in the bearing can be damaged or subject to increased wear.

WO 2019/030181 A1 describes an electrical machine in which a shielding arrangement is present between the stator winding and the bearing outer rings of the bearing arrangement. The shielding arrangement and the stator are respectively electrically connected with an electric potential. For example, stator as well as the shielding arrangement can be connected with the ground potential of the electrical circuit. As an alternative to this it is also possible to connect the shielding arrangement with earth, whereas the stator is then connected with ground potential. In another embodiment the stator does not comprise a potential connection, whereas the shielding arrangement is connected to earth via an impedance.

From Vostrov et al. "Shielding the end windings to reduce bearing currents", 2020 *International Conference on Electrical Machines (ICEM)*, Gothenburg, 2020, pages 1431-1437, doi: 10.1109/ICEM49940.2020.9270673 it is known to use electrostatical shieldings for covering the end side stator windings as counter measure against parasitic effects. The electrostatical shielding can comprise one or more conductor loops that can be grounded. The conductor loops are arranged coaxially to the rotation axis adjacent to the air gap around the axial ends of the stator winding.

Moreover, it is described in F. J. T. E. Ferreira et al, "Evaluation of Slot-Embedded Partial Electrostatic Shield for High-Frequency Bearing Current Mitigation in Inverter-Fed Induction Motors", in *IEEE Transactions on Energy Conversion*, vol. 27, no. 2, pp. 382-390, June 2012, doi: 10.1109/TEC.2012.2187452 to arrange a shielding in the groove slots of the stator winding that are connected with earth.

U.S. Pat. No. 7,113,365 B1 describes a disc drive having an electric motor. The electric motor has a ring-shaped stator comprising a cylindrical central body. On the cylindrical central body a hub is arranged that is arranged in an axial direction parallel to the rotation axis adjacent to a stator winding. The hub supports magnets arranged radially outside from the stator winding. The hub and the magnets thus form the rotor. In axial direction the stator winding and the magnets of the rotor are arranged outside of the axial region that is limited by the two bearings.

An electric motor having a stator comprising a sleeve-shaped central body and a shaft rotatably supported inside the sleeve-shaped central body for supporting the rotor is described in US 2018/0298908 A1. The shaft projects from the central body and comprises a support plate of a rotor extending radially to the rotation axis on the outer end of which permanent magnets of the rotor are arranged that surround the stator winding coaxially.

A shielding extending substantially radially to the rotation axis is arranged axially adjacent to the stator winding in U.S. Pat. No. 7,113,365 B1 as well as US 2018/0298908 A1.

WO 2019/030181 A1 shows an electric motor having a shielding that surrounds end sections of a stator winding in a cap-shaped manner. The shielding has two shielding units, wherein each shielding unit is arranged on the level of a bearing arrangement, by means of which the rotor is rotatably supported on a central body.

JP 2008-263698 A describes the possibility to electrically insulate bearings of an electric motor relative to the stator.

It has, however, shown that the known principles are partly not usable for all machine types and depending on the machine type no sufficient protection effect is entailed for the bearing arrangement.

BRIEF SUMMARY

It can thus be considered as object of the present invention to achieve an improvement of the protection of the bearing arrangement from common mode voltage effects in electrical machines.

An electrical machine, including: a stator comprising an electrically conductive winding support electrically connected with earth or a reference potential and a central body defining a rotation axis and a stator winding; a bearing arrangement comprising a first bearing arranged on the central body and a second bearing arranged on the central body, wherein the winding support of the stator is arranged in an axial direction parallel to the rotation axis between the first bearing and the second bearing; a rotor rotatably supported around the rotation axis by means of the bearing arrangement; an electrically conductive first shielding unit electrically connected with earth or a reference potential that comprises a first ring part extending in a ring-shaped manner in a circumferential direction around the rotation axis and extending starting from a radial inner end radially outward to a radial outer end, wherein the radial inner end is arranged between the first bearing and the winding support and is connected with the central body; and an electrically conductive second shielding unit that is electrically connected with earth or a reference potential that comprises a second ring part extending in a ring-shaped manner in circumferential direction around the rotation axis and extending starting from a radial inner end radially outward to a radial outer end, wherein the radial inner end is arranged between the second bearing and the winding support and is connected with the central body.

The electrical machine according to the present invention is particularly operated as motor and thus forms an electric motor. Preferably the electric motor is operated with alternating current and particularly multi-phase alternating current. The electrical machine can be an asynchronous machine or a synchronous machine. For controlling or operating the electrical machine or the electric motor, a converter, e.g. frequency converter, can be used that can comprise a direct current link.

The electrical machine has a stator having a stator winding. The stator winding can comprise multiple separate winding groups depending on the number of phases of the electrical machine or the electric motor. By means of the stator winding an electromagnetic rotating field is created around a rotation axis in order to rotationally drive a rotor around the rotation axis. The rotor is rotatably supported around the rotation axis by means of a bearing arrangement. Preferably the rotor is arranged radially inward from the stator such that the electrical machine is configured as external rotor machine.

The stator has a winding support made of electrically conductive material on which the stator winding is arranged. The stator winding is electrically insulated relative to the winding support. The winding support is electrically connected with earth or the winding support is electrically connected with a reference potential. A central body is part of the winding support. The central body defines the rotation axis and extends along the rotation axis for this purpose. The central body can have a cylindrical outer surface and can be configured as pin or sleeve.

A first bearing and a second bearing are part of the bearing arrangement. The first bearing and the second bearing are arranged on the central body and thus support the rotor on the central body. The first bearing and the second bearing are arranged with distance to one another in axial direction parallel to the rotation axis. The winding support of the stator is arranged between the first bearing and the second bearing in axial direction. In the preferred embodiment the bearings are rolling bearings, e.g. ball bearings or roller bearings.

The electrical machine further comprises a first shielding unit as well as a second shielding unit that are electrically conductive. The shielding units can be manufactured from an arbitrary electrically conductive material, e.g. a metallic material or a metallic alloy or a compound material comprising electrically conductive components.

The first shielding unit and the second shielding unit are connected with earth or with a reference potential, preferably by means of an impedance. The impedance can have an ohmic part and/or an inductive part and/or a capacitive part. The impedance can thereby be formed by at least one component and/or parasitic characteristics, e.g. a contact or supply line. As reference potential a potential of a direct current link of the converter can be used, e.g. a ground potential.

The first shielding unit can be formed by an integral or monolithic first shielding element. Alternatively or additionally, the second shielding unit can be formed by an integral or monolithic second shielding element.

The first shielding unit has a ring part that extends in a circumferential direction around the rotation axis. The first ring part extends from a radial inner end to a radial outer end obliquely and/or orthogonal to the rotation axis. The radial inner end is arranged in axial direction between the first bearing and the winding support and mechanically connected with the central body. Preferably also an electrical connection between the first shielding unit and the central body is established by means of this mechanical connection.

The second shielding unit also comprises a ring part extending in circumferential direction around the rotation axis. The second ring part extends from a radial inner end outwardly to a radial outer end obliquely and/or orthogonal to the rotation axis. In axial direction the radial inner end is arranged between a second bearing and the winding support and mechanically connected with the central body. Preferably also an electrical connection between the second shielding unit and the central body is established by means of this mechanical connection.

Thus, the possibility exists to electrically connect the first shielding arrangement and/or the second shielding arrangement with reference potential or earth via the central body.

The shielding units are part of the stator and therefore arranged non-rotatably relative to the central body.

By means of the shielding units a shielded space is created in which the stator winding and the winding support are located. Due to the electrical connection of the shielding units with earth or a reference potential, an influence of the parasitic capacitances between the bearings and the stator winding as well as between the stator winding and the rotor is achieved. The capacitive coupling between the stator winding and the rotor is reduced and/or the capacitive coupling between the rotor and the stator is increased. Detrimental electrical currents and/or voltages at the bearings of the bearing arrangement can be avoided or at least reduced. The danger of a voltage flashover at the bearings is remarkably reduced.

It is advantageous, if the first shielding unit comprises a ring-shaped first circumferential part that extends in an axial direction parallel to the rotation axis and in circumferential direction around the rotation axis. The first circumferential part can form a closed ring in circumferential direction or can preferably comprise through holes arranged with distance to one another in circumferential direction. Preferably the circumferential part is connected to the first ring part at the radial outer end of the first shielding unit.

Analog to this the second shielding unit can comprise a ring-shaped second circumferential part that extends in axial direction and in circumferential direction around the rotation axis and that can form a closed ring in circumferential direction or that can preferably comprise through holes arranged with distance to one another in circumferential direction. Preferably the second circumferential part is connected to the second ring part at the radial outer end of the second shielding unit.

The two circumferential parts can be arranged between the stator winding and the rotor. The two circumferential parts can be arranged on the same cylindrical surface around the rotation axis and thus can have the same distance from the rotation axis.

The optional through holes in the first circumferential part and/or the second circumferential part are provided at locations in circumferential direction at which preferably a high air flow shall be produced, e.g. in radial direction approximately aligned with a groove provided between two directly adjacent teeth of the winding support. Thereby the two teeth or at least a part of at least one adjacent tooth can be covered by a web of the respective circumferential part extending substantially in axial direction.

The optional through holes in the first circumferential part and/or the second circumferential part may be limited by an edge that does not extend inside one single plane. For example at least one section of the edge can project out of a plane inside which the at least one other section of the edge extends.

The first circumferential part and the first ring part can be configured integrally or monolithically. As an alternative or in addition, the second circumferential part and the second ring part can be configured integrally or monolithically. As an option it is possible that the two shielding units and particularly the two circumferential parts are connected with one another by axial webs extending in axial direction. The axial webs can extend along the teeth of the winding support of the stator, for example. The axial webs can also be provided at each circumferential part without establishing a connection to the respective other circumferential part. In circumferential direction the axial webs of one circumferential part can be offset from the axial webs of the other circumferential part. If the axial webs of the different circumferential parts are assigned to a common tooth, they can in sections extend in axial direction along the tooth.

It is advantageous, if the two shielding units are arranged in a space that is completely surrounded by the central body, the two bearings and the rotor.

The first circumferential part and the second circumferential part can be arranged with distance to one another in axial direction. Preferably, the two circumferential parts are exclusively indirectly mechanically connected with each other by means of the ring parts and the stator, e.g. the central body of the stator. In the range of the air gap or in a range of the stator winding adjoining the air gap, the two circumferential parts are without direct mechanical or electrical connection. In this configuration the shielding arrangement does not have any component that extends in axial direction between one circumferential part up to the other circumferential part. The configuration of the shielding arrangement can thereby be simplified. The two shielding units can be handled and installed independent from one another.

It is moreover advantageous, if the first ring part and/or the second ring part comprises multiple through holes respectively. The through holes are arranged in circumferential direction with distance to one another in the respective ring part, preferably with uniform distance. The through holes are, according to the example, limited by a continuous edge of the ring part and are thus completely surrounded by the edge. With view radially relative to the rotation axis the through holes are preferably arranged along the stator winding or in the region of the stator winding. Each through hole can have an width in circumferential direction that is increasing with increasing distance from the rotation axis and can have a trapezoidal shape with view in axial direction, for example. Two through holes that are directly adjacent in circumferential direction are separated from one another by means of a web of the first ring part or the second ring part. Preferably also the optionally present circumferential parts comprise through holes.

The first ring part and/or the second ring part can have an inner ring section and/or an outer ring section respectively. For example, the outer ring section can adjoin to the optionally provided first circumferential part or the optionally provided second circumferential part. The outer ring section extends substantially parallel to a plane that is orientated orthogonal to the rotation axis. The inner ring section can extend relative to the rotation axis in an angle being unequal to 90°.

The two shielding units or the two shielding elements are preferably not directly connected with one another mechanically and/or electrically, but configured as separate shielding elements. The shielding elements or the shielding units are, for example, indirectly connected with each other mechanically and/or electrically, e.g. by means of the central body.

In a preferred embodiment the first bearing and the second bearing are electrically insulated relative to the stator. The first bearing and the second bearing can be supported on the central body and can be electrically insulated relative to the central body by means of an inner insulator respectively.

In addition or as an alternative, it is possible to insulate the first bearing and the second bearing electrically relative to the rotor. For example, an outer insulator can be arranged between the first bearing and the rotor as well as the second bearing and the rotor respectively.

BRIEF DESCRIPTION OF THE FIGURES

Advantageous embodiments of the invention are derived from the dependent claims, the description and the drawings. In the following, preferred embodiments of the invention are explained in detail based on the attached drawings. The drawings show:

DETAILED DESCRIPTION

Figure 1:
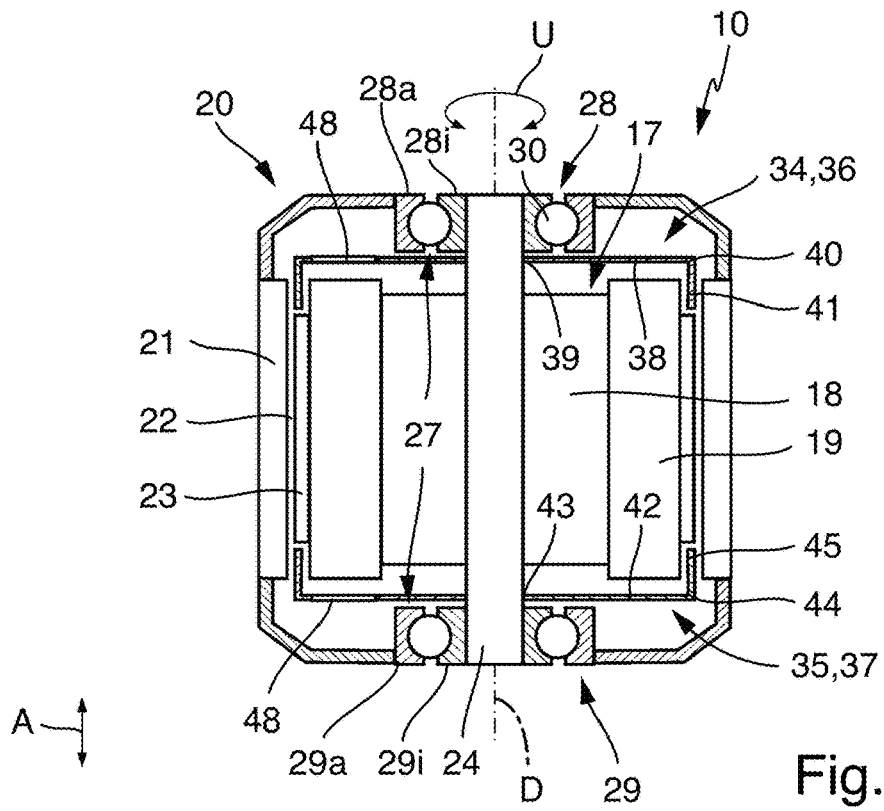
FIG. 1 an embodiment of an electrical machine in a schematic partly sectional principle illustration, FIG. 2 a further embodiment of the electrical machine in an illustration according to FIG. 1, FIG. 3 an embodiment of the electrical machine having a configuration according to FIG. 1 or FIG. 2 in a perspective sectional illustration in a sectional plane along a rotation axis, FIG. 4 an illustration of the embodiment according to FIG. 3 in part in the region of an air gap between a stator and a rotor, FIG. 5 an illustration of the embodiment according to FIG. 3 in part in the region of a radial inner end of a first shielding unit of the electrical machine, FIG. 6 an illustration of the embodiment according to FIG. 3 in part in the region of a second shielding unit of the electrical machine, FIG. 7 an electric equivalent circuit of a network of parasitic capacitances of the electrical machine having a configuration according to FIG. 1, FIG. 8 an electric equivalent circuit of a network of parasitic capacitances of the electrical machine having the configuration of the electrical machine according to FIG. 2, FIG. 9 a block diagram of an electrical circuit for controlling an electrical machine according to the invention and FIG. 10 a perspective illustration in part of a modified embodiment for forming a through hole in a shielding unit.
Figure 2:
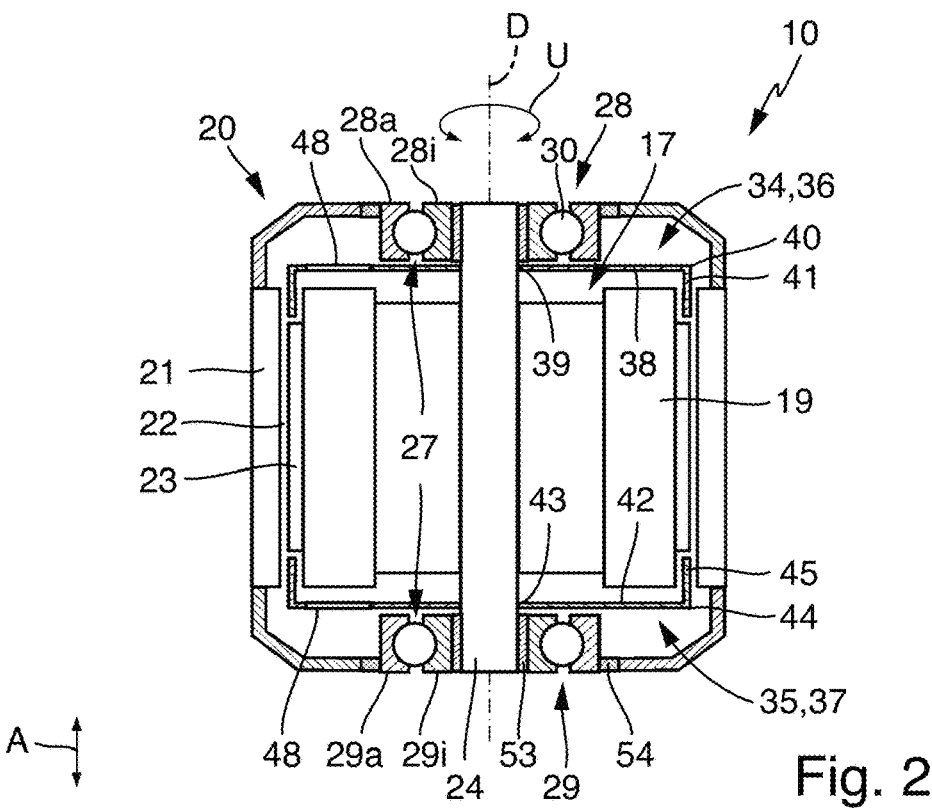
Figure 9:
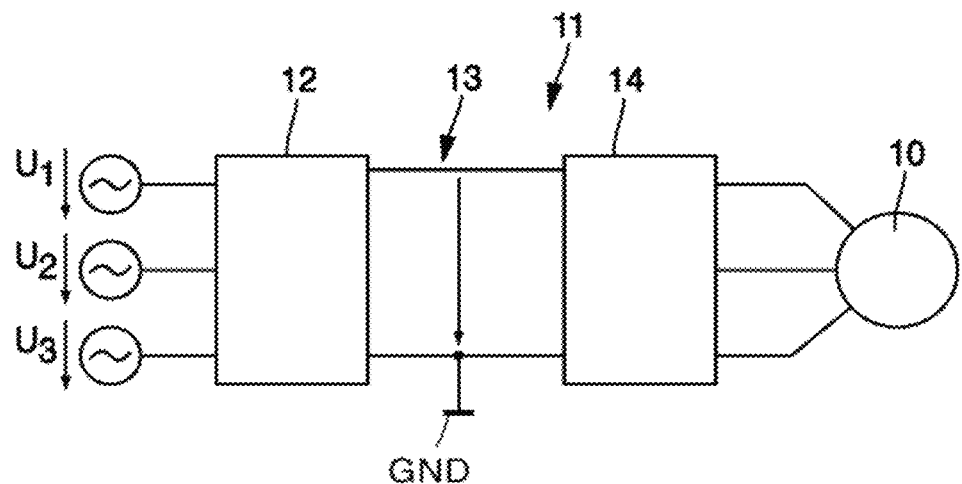

In FIGS. 1 and 2 an embodiment of an electrical machine 10 is illustrated respectively that can be operated as motor and thus can form an electric motor. The electrical machine 10 can be, for example, an electrical machine that can be operated by means of alternating voltage, preferably multi-phase and according to the example, three-phase alternating voltage. The operation of an electrical machine 10 by means of three-phase alternating voltage is schematically illustrated in FIG. 9. The electrical machine is connected via a converter circuit 11 to phase voltages $U_1$, $U_2$, $U_3$ of a three-phase alternating voltage power grid. In the embodiment the converter circuit 11 has rectifier 12 that rectifies the three-phase alternating voltage and provides a direct voltage in a DC link 13 that is converted into a multi-phase and according to the example three-phase alternating voltage by means of an inverter 14 of converter circuit 11 for producing a rotating field in the electrical machine 10. Also other converter topologies can be used.

Figure 7:
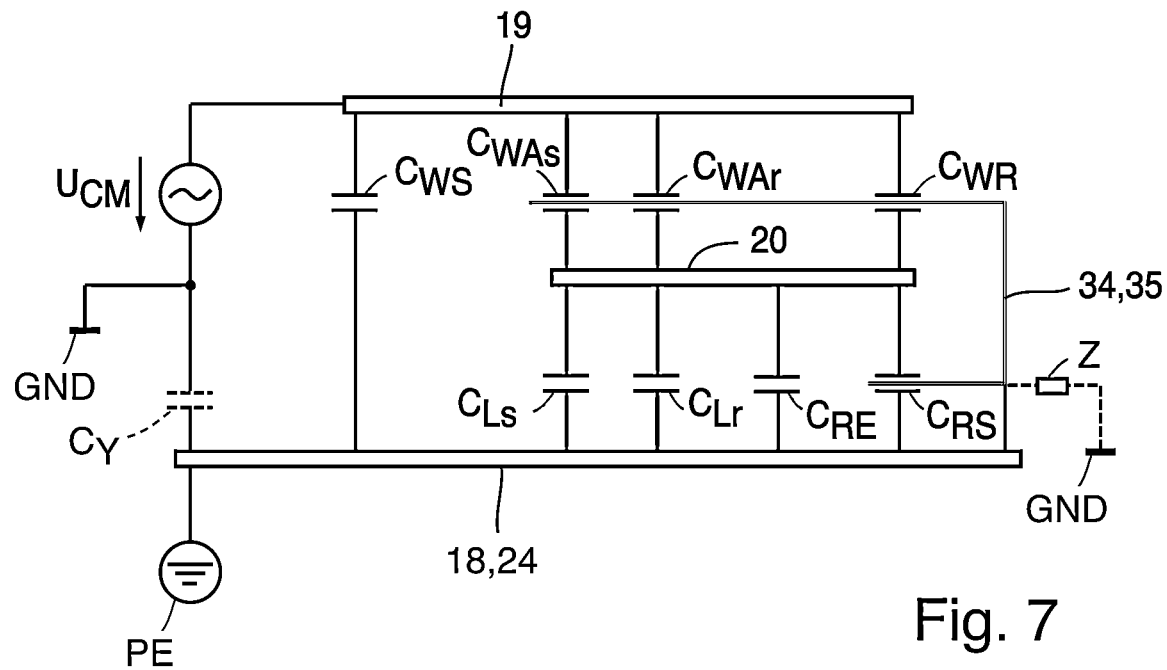
Figure 8:
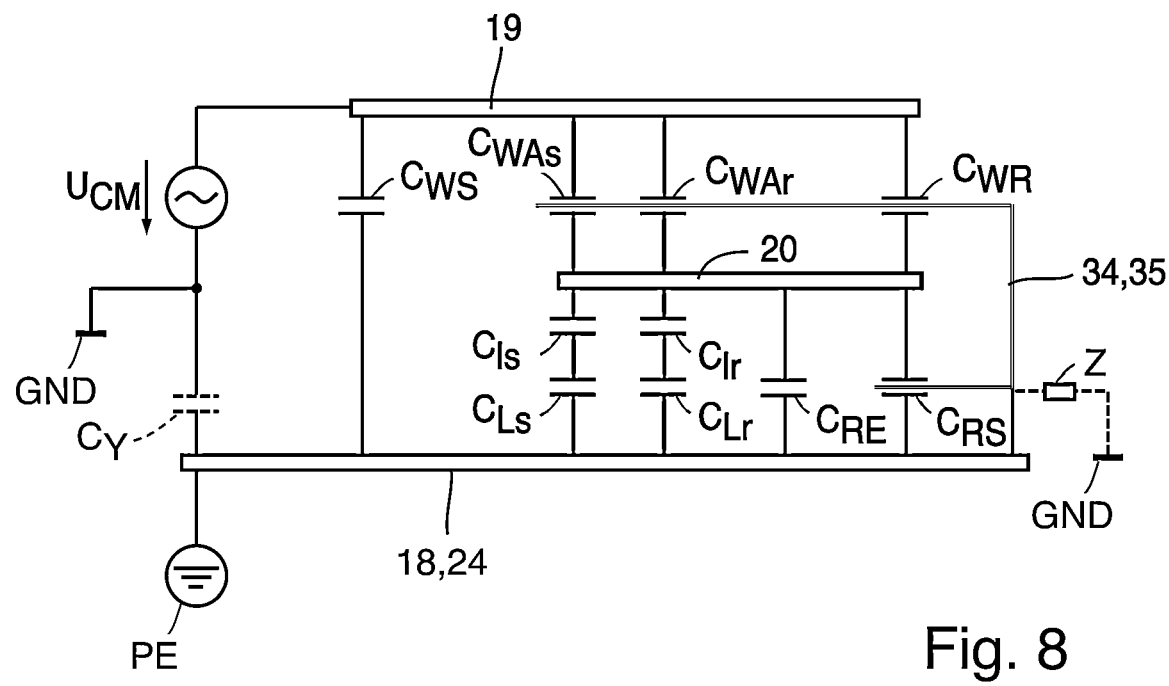

The three-phase alternating voltage provided for the electrical machine 10 for creation of the rotating field by means of the converter circuit 11 is not always equal to zero and thereby, a common mode voltage $U_{CM}$ is created that is also denoted as common mode. Due to this common mode voltage, a network of parasitic capacitances can be formed at components of the electrical machine that are not completely short-circuited and for example separated from each other by a lubricant, air or the like, as schematically illustrated in FIGS. 7 and 8 for different embodiments according to FIGS. 1 and 2. If the common mode voltage exceeds a certain amount, a breakthrough can occur between the components of the electrical machine forming the parasitic capacitance, which may entail damages or an increased wear. These effects shall be reduced and eliminated in the ideal case by means of the present invention.

The electrical machine 10 comprises a stator 17, an electrically conductive winding support 18 as well as a stator winding 19. In the embodiment the stator winding 19 comprises multiple winding groups electrically separated from each other, e.g. three winding groups. According to the example, winding support 18 is arranged on a central body 24 of stator 17 that extends along a rotation axis D. The central body 24 can be pin-shaped or sleeve-shaped. The outer surface of central body 24 facing radially outward is preferably configured without steps and according to the example by a cylinder shell surface.

The winding support 18 and optionally also central body 24 is or are electrically conductive and electrically connected with earth PE, which is apparent from FIGS. 7 and 8 in the electrical equivalent circuit. The stator winding 19 is electrically insulated relative to winding support 18.

The electrical machine 10 further comprises a rotor 20 that is rotatably supported around the rotation axis D and can be driven rotatably around rotation axis D by means of a rotating field produced by stator winding 19. For this purpose rotor 20 can have permanent magnets 21. In a radial direction radial to rotation axis D an air gap 22 is formed between the permanent magnets 21 of rotor 20 and teeth 23 of winding support 18. The teeth 23 are separated from one another in circumferential direction U by means of not illustrated grooves, wherein conductor sections of stator winding 19 extend inside the grooves.

The rotor 20 is rotatably supported around rotation axis D by means of a bearing arrangement, wherein the bearing arrangement can be supported on the central body 24 according to the example or also on another part of stator 17. In the embodiment the bearing arrangement 27 has a first bearing 28 and a second bearing 29 that are arranged with distance to one another in an axial direction A parallel to rotation axis D. In axial direction A winding support 18 is arranged between first bearing 28 and second bearing 29.

Each bearing 28, 29 has an outer ring 28a, 29a and an inner ring 28i, 29i. The outer rings 28a, 29a are mechanically connected with rotor 20, whereas the inner rings 28i, 29i are arranged on a stationary part and according to the example on the central body 24. In the embodiment bearings 28, 29 are configured as rolling bearings, so that rolling elements 30, according to the example balls, are arranged between the respective outer ring 28a, 29a and the assigned inner ring 28i, 29i.

The electrical machine 10 further comprises a first shielding unit 34 adjacent to the first bearing 28 and a second shielding unit 35 adjacent to the second bearing 29. In the embodiment the two shielding units 34, 35 are respectively realized by an integral component, namely a first shielding element 36 and a second shielding element 37. In modification to the embodiment the shielding units 34, 35 could be configured in a multi-part manner respectively as well.

Figure 3:
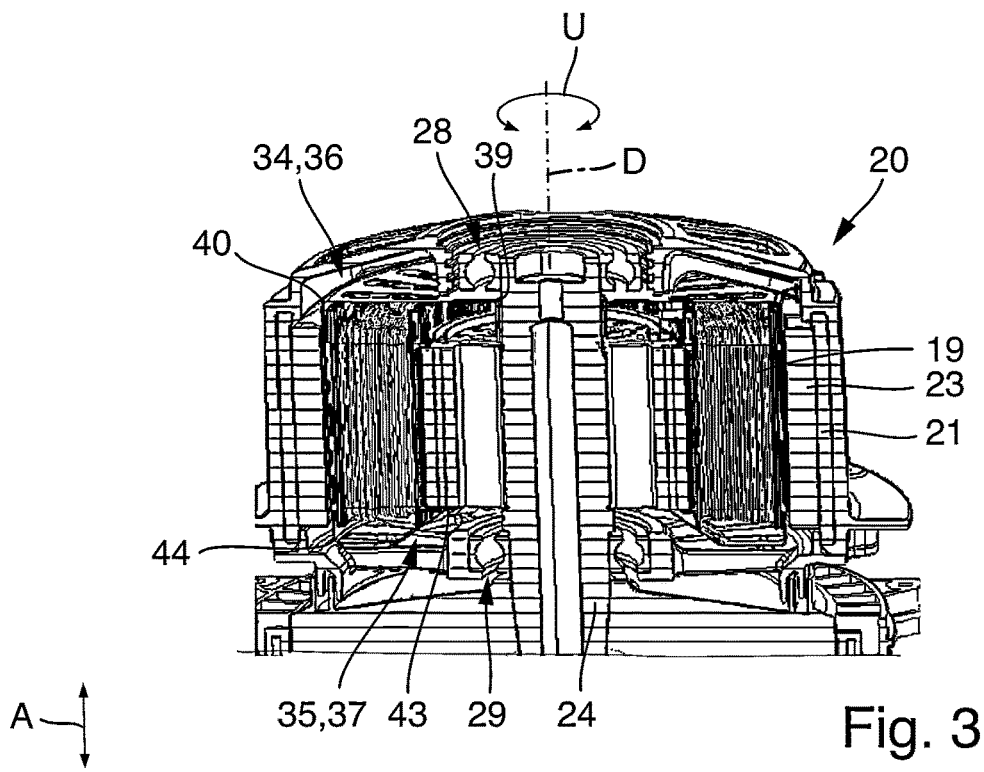
Figure 4:
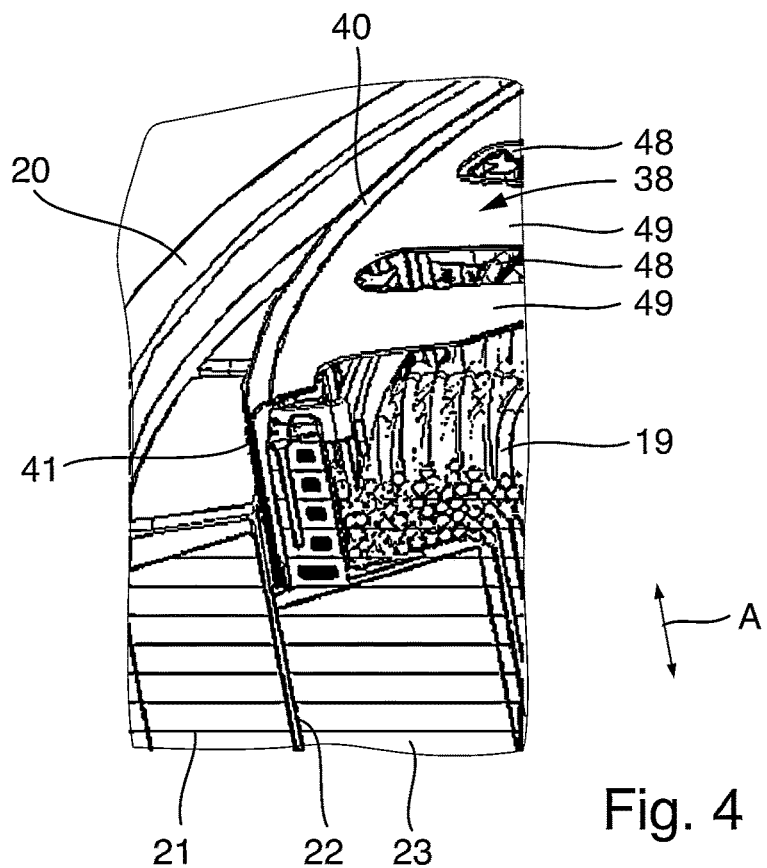
Figure 5:
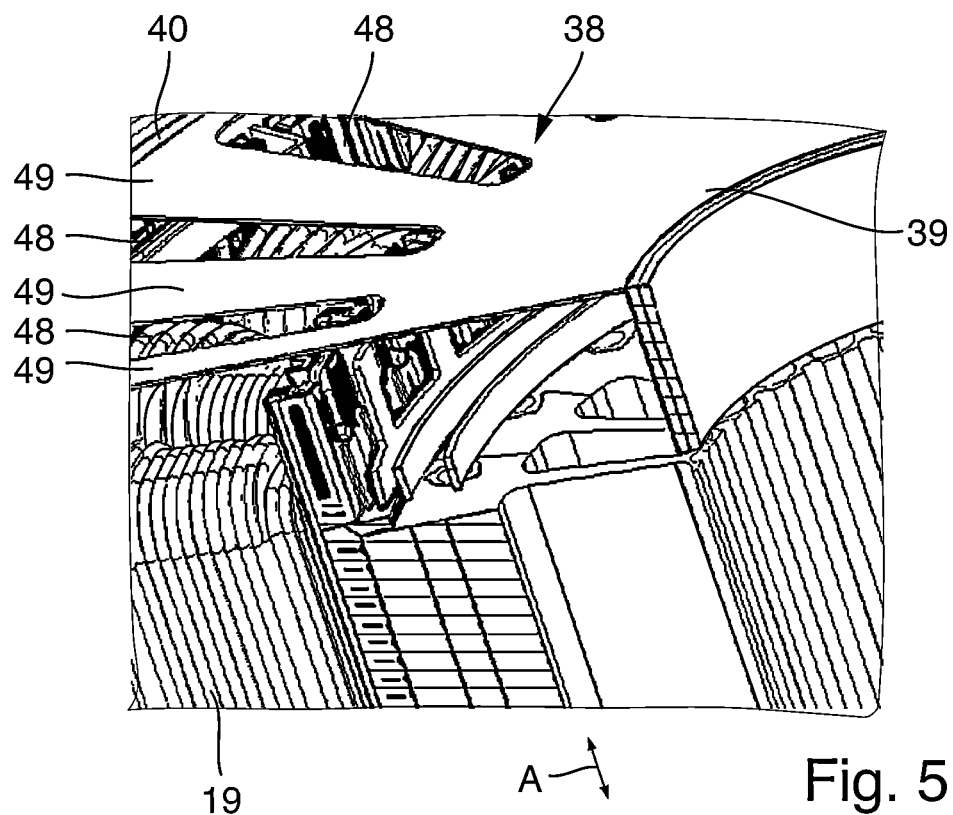

As apparent from FIGS. 3-5, first shielding element 36 has a first ring part 38 that extends from a radial inner end 39 of first shielding unit 34 or first shielding element 36 to a radial outer end 40 of first shielding unit 34 or first shielding element 36. On the radial outer end first shielding unit 34 or first shielding element 36 comprises a first circumferential part 41 extending coaxially to the rotation axis D. According to the example, the first circumferential part 41 extends on a cylinder shell surface coaxially arranged relative to the rotation axis D. Starting from the first ring part 38, the first circumferential part 41 extends in axial direction A toward the second shielding unit 35. The first circumferential part 41 projects in axial direction A over the adjacent axial end of stator winding 19 that is also denoted as coil end turns. The axial end of stator winding 19 and the first circumferential part 41 are arranged in overlapping manner in axial direction A.

The second shielding unit 35 or the second shielding element 37 are configured analog to the first shielding unit 34 or the first shielding element 36. Second shielding element 37 has a second ring part 42 that extends from a radial inner end 43 of second shielding unit 35 or second shielding element 37 to a radial outer end 44 of second shielding unit 35 or second shielding element 37. On the radial outer end 44 the second shielding unit 35 or the second shielding element 37 comprises a second circumferential part 45 extending coaxially to the rotation axis D. According to the example, second circumferential part 45 extends along a cylinder shell surface arranged coaxially to the rotation axis D. Starting from the second ring part 42, the second circumferential part 45 extends in an axial direction toward the first shielding unit 34. The second circumferential part 45 projects in axial direction A over the adjacent axial end of stator winding 19 that is also denoted as coil end turn. The axial end of stator winding 19 and the second circumferential part 45 are arranged in overlapping manner in axial direction A.

The radial inner ends 39, 43 are directly mechanically connected with central body 24 according to the example and thereby preferably establish an electrical connection between the central body 24 and respective shielding unit 34 or 35. The shielding units 34, 35 are therefore electrically connected with a reference potential (here: ground potential GND) or earth PE via central body 24.

The electrical machine limits a space by means of central body 24, the two bearings 28, 29 and rotor 20 in which the shielding units 34, 35 are arranged. No component of the shielding units 34, 35 projects out of this space.

Figure 6:
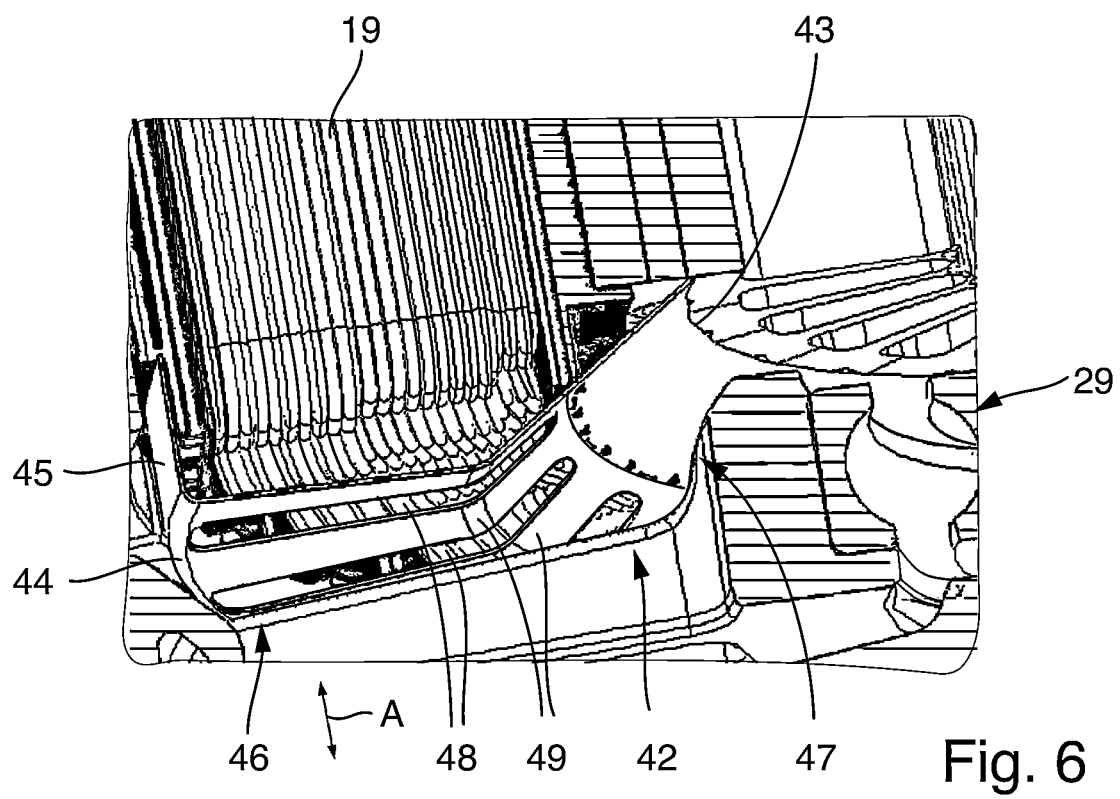

The first ring part 38 and the second ring part 42 can extend parallel to a plane, as schematically illustrated in FIGS. 1 and 2 that is orientated orthogonal to rotation axis D. Each ring part 38, 42 can comprise an outer ring part 46 and an inner ring part 47. The outer ring part 46 extends substantially parallel to a plane that is orientated orthogonal to the rotation axis D. In a modified embodiment the inner ring part 47 extends obliquely inclined relative to the rotation axis D and thereby comprises a conical shape that is enlarged toward the outer ring section 46. This is illustrated in FIG. 6 for the second ring part 42 by way of example.

Through holes 48 are uniformly arranged with distance to one another in circumferential direction U in the ring parts 38, 42. According to the example, the through holes 48 extend adjoining to the radial outer end 40, 44 in radial direction radially relative to rotation axis D and preferably end with distance to the respective radial inner end 39, 43. The through holes 48 are provided in the ring part 38, 42 where the ring part 38, 42 extends along the stator winding 19. Two through holes 48 that are directly adjacent in circumferential direction are separated from one another by means of a web 49 of the ring part 38 or 42 respectively.

If a rotating field is produced by means of the stator winding 19, electromagnetic stray fields are created in axial direction A that can create eddy currents and thereby losses in the shielding units 34, 35. Due to the through holes 48 adjacent to the axial ends of stator winding 19, such eddy current losses are at least reduced. Moreover, the through holes 48 can be used for cooling of winding support 18 or stator winding 19. As necessary a fan propeller can be arranged on rotor 20 in order to effectuate the cooling air transport.

Figure 10:
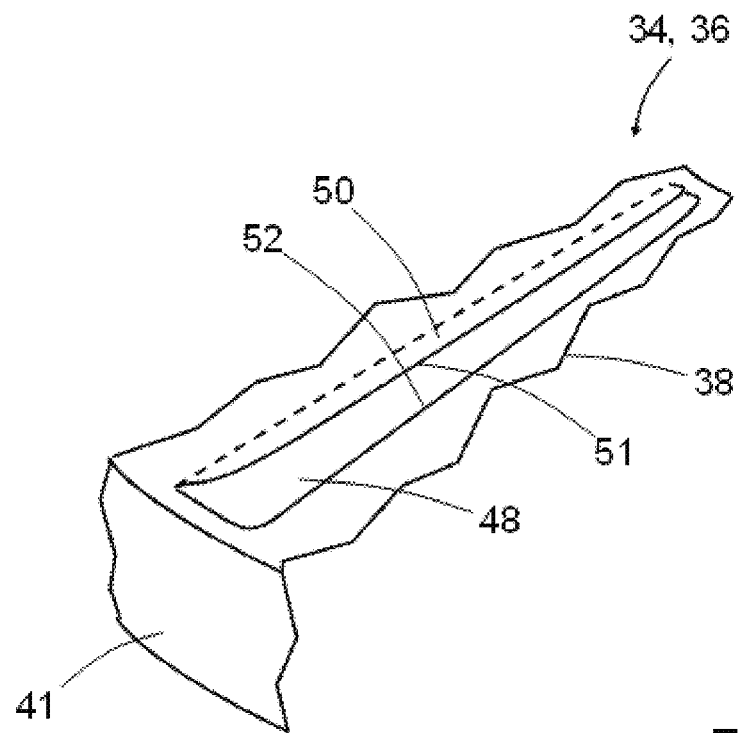

As schematically illustrated in FIG. 10, the edge that limits the respective through hole 48 can have an extension that does not extend entirely inside one single plane. Particularly at least one section of the edge can have an axial position that deviates from the axial position of the opposite section of the edge. As can be seen in FIG. 10, the edge sections of the through hole 48 that extend at least substantially in radial direction, can be offset from one another in axial direction A. For example, a first edge section 51 can be arranged at an air guide part 50 that extends obliquely over the through hole 48. A second edge section 52 that is located opposite in circumferential direction is arranged offset in axial direction A relative to the first edge section 51.

The air guide part 50 can be integrally or monolithically connected with the directly adjacent web 49. The air guide part 50 can be created during manufacturing of the through hole 48 by forming a separating groove along the second edge section 52 of the through hole 48 and by bending of the area limited by the separating groove, for example. In doing so, the cooling air transport toward the stator winding 19 can be improved. Preferably the air guide part 50 is arranged on the downstream side of through hole 48 in air flow direction. According to the example, the air guide part 50 extends from the respective shielding unit 34, 35 toward the axially directly adjacent part of the stator 17. However, also other shapings and configurations of an edge of the through hole that does not extend in one single plane are possible in order to improve the cooling air transport. In FIG. 10 the first shielding unit 34 is shown only by way of example. The through holes 48 of the second shielding unit 35 can be realized in analog manner.

In the embodiments the circumferential parts 41, 45 comprise through holes analog to the ring parts 38, 42, but can also be without through holes alternatively. The circumferential parts 41, 45 extend in circumferential direction U around the rotation axis D, whereby the through holes can be arranged uniformly distributed in circumferential direction U.

A respective electrical equivalent circuit is illustrated in FIGS. 7 and 8 that illustrates the network of parasitic capacitances of the electrical machine 10, wherein the equivalent circuit according to FIG. 7 corresponds to the embodiment according to FIG. 1 and the equivalent circuit according to FIG. 8 corresponds to the embodiment according to FIG. 2.

According to the invention, the winding support 18 and as an option also the central body 24 are connected with earth PE. Due to a common mode voltage $U_{CM}$ created in the converter circuit 11 that is applied between stator winding 19 and ground potential GND of converter circuit 11, parasitic capacitances are effective between the components of electrical machine 10, as illustrated in FIGS. 7 and 8:

$C_{WS}$: parasitic capacitance between stator winding 19 and winding support 18 or earth PE;

$C_{WAs}$: parasitic capacitance between stator winding 19 and the outer rings 28a, 29a toward stator 17 or winding support 18;

$C_{WAr}$: parasitic capacitance between stator winding 19 and outer rings 28a, 29a toward rotor 20;

$C_{WR}$: parasitic capacitance between stator winding 19 and rotor 20;

$C_{Ls}$: capacitance of bearing arrangement 27 toward stator 17 or winding support 18;

$C_{Lr}$: parasitic capacitance of bearing arrangement 27 toward rotor 20;

$C_{RE}$: parasitic capacitance between rotor 20 and earth PE;

$C_{RS}$: parasitic capacitance between rotor 20 and stator 17 or winding support 18;

$C_Y$: optional capacitance created by the coupling with an optionally provided EMC-filter and/or by means of Y-capacitors installed in the converter.

The parasitic capacitance $C_Y$ can be omitted, e.g. if no EMC-filter is present and/or if no Y-capacitors are installed in the converter.

The parasitic capacitances mentioned above are present in both embodiments according to FIGS. 1 and 2. The difference between these two embodiments of FIGS. 1 and 2 is that in the embodiment according to FIG. 2 an inner insulator 53 between the central body 24 and the bearing inner rings 28i, 29i and/or an outer insulator 54 between the bearing outer rings 28a, 29a and the rotor 20 is additionally arranged. In this manner the bearing arrangement 27 can be electrically insulated relative to the central body 24 and thus stator 17 and/or relative to the rotor 20. Due to these optional insulators 53, 54, additional parasitic capacitances are created that are illustrated in FIG. 8:

CIs: parasitic capacitance of the at least one inner insulator 53;

CIr: parasitic capacitance of the at least one outer insulator 54.

The shielding units 34, 35 are either earthed (short-circuited with earth PE) or connected via an impedance Z with ground potential GND or another non-varying reference potential. The impedance Z can comprise an ohmic part and/or a capacitive part and/or an inductive part.

The shielding units 34, 35 are electrically conductive, however, preferably not ferromagnetic. They shield the electrical stray fields of stator winding 19 at least partly and thus influence the parasitic capacitances of the electrical machine, as schematically illustrated in FIGS. 7 and 8. Thereby particularly the following parasitic capacitances $C_{WAs}$, $C_{WAr}$ and $C_{WR}$ between stator winding 19 and rotor 20 are reduced and the capacitive coupling between stator winding 19 and rotor 20 is lowered and eliminated in the ideal case. In addition, the parasitic capacitance $C_{RS}$ between the rotor 20 and the stator 17 or winding support 18 and/or central body 24 is reduced or eliminated. In addition, also the parasitic capacitance and thus the capacitive coupling between the rotor 20 and the stator 17 can be reduced and eliminated in the ideal case. Due to the grounded shielding units 34, 35, the capacitive coupling between rotor 20 and earth PE increases.

In this manner the bearings 28, 29 of bearing arrangement 27 are better protected from detrimental voltage breakthroughs or currents.

The invention refers to an electrical machine 10 comprising a stator 17, a rotor 20 and a bearing arrangement 27 having a first bearing 28 and a second bearing 29 on opposite sides of the stator 17 as well as a shielding arrangement comprising a first shielding unit 34 and a second shielding unit 35. The rotor 20 is rotatably supported around a rotation axis D by means of bearings 28, 29. The shielding units 34, 35 are electrically conductive and comprise a ring part 38, 42 in each case that extends originating from a radial inner end 39, 43 to a radial outer end 40, 44 away from the rotation axis D. Preferably each shielding unit 34, 35 has a circumferential part 41, 45 on its radial outer end 40, 44 that extends in a continuous ring-shaped manner around rotation axis D and is arranged in overlapping manner with the adjacent axial end of stator winding 19 in axial direction. The circumferential parts 41, 45 are preferably completely closed, whereas the ring parts 28, 42 can comprise through holes 48.

LIST OF REFERENCE SIGNS

10 electrical machine
11 converter circuit
12 rectifier
13 DC link
14 inverter
17 stator
18 winding support
19 stator winding
20 rotor
21 permanent magnets
22 air gap
23 tooth
24 central body
27 bearing arrangement
28 first bearing
28a outer ring of first bearing
28i inner ring of first bearing
29 second bearing
29a outer ring of second bearing
29i inner ring of second bearing
30 rolling element
34 first shielding unit
35 second shielding unit
36 first shielding element
37 second shielding element
38 first ring part
39 radial inner end of first shielding unit
40 radial outer end of first shielding unit
41 first circumferential part
42 second ring part
43 radial inner end of second shielding unit
44 radial outer end of second shielding unit
45 second circumferential part
46 outer ring section
47 inner ring section
48 through hole
49 web
50 air guide part
51 first edge section
52 second edge section
53 inner insulator
54 outer insulator
A axial direction
$C_{Ir}$ capacitance rotor side insulation
$C_{Is}$ capacitance stator side insulation
$C_{Lr}$ capacitance rotor side bearing
$C_{Ls}$ capacitance stator side bearing
$C_{WAs}$ capacitance stator winding—stator side outer ring
$C_{WS}$ capacitance stator winding—stator
$C_{WAr}$ capacitance stator winding—rotor side outer ring
$C_{WR}$ capacitance stator winding—rotor
$C_{RE}$ capacitance rotor—earth
$C_{RS}$ capacitance rotor—stator
$C_Y$ coupling capacitance to EMC-filter
D rotation axis
GND ground potential
PE earth
U circumferential direction
$U_1$ phase voltage first phase
$U_2$ phase voltage second phase
$U_3$ phase voltage third phase
$U_{CM}$ common mode voltage
Z impedance

The invention claimed is:

1. An electrical machine, comprising:
a stator comprising an electrically conductive winding support electrically connected with earth or a reference potential and a central body defining a rotation axis and a stator winding;
a bearing arrangement comprising a first bearing arranged on the central body and a second bearing arranged on the central body, wherein the winding support of the stator is arranged in an axial direction parallel to the rotation axis between the first bearing and the second bearing;
a rotor rotatably supported around the rotation axis by means of the bearing arrangement;
an electrically conductive first shielding unit electrically connected with earth or a reference potential that comprises a first ring part extending in a ring-shaped manner in a circumferential direction around the rotation axis and extending starting from a radial inner end radially outward to a radial outer end, wherein the radial inner end is arranged between the first bearing and the winding support and is connected with the central body; and
an electrically conductive second shielding unit that is electrically connected with earth or a reference potential that comprises a second ring part extending in a ring-shaped manner in circumferential direction around the rotation axis and extending starting from a radial inner end radially outward to a radial outer end, wherein the radial inner end is arranged between the second bearing and the winding support and is connected with the central body, wherein the first ring part and/or the second ring part comprise through holes arranged with distance to one another in the circumferential direction, and a first edge section of an edge of each of the through holes is arranged at an air guide part extending obliquely over a respective one of the through holes and a second edge section of the edge of each of the through holes is arranged opposite the first edge section in the circumferential direction and the second edge section is off-set in the axial direction relative to the first edge section.

2. The electrical machine according to claim 1, wherein the first shielding unit and the second shielding unit are arranged in a space that is completely surrounded by the central body, the first bearing and the second bearing and the rotor.

3. The electrical machine according to claim 2, wherein the first shielding unit is electrically connected with the central body via the first ring part and with earth or the reference potential via the central body and the second shielding unit is electrically connected with the central body via the second ring part and with earth or the reference potential via the central body.

4. The electrical machine according to claim 3, wherein the central body is a cylindrical sleeve or a cylindrical pin.

5. The electrical machine according to claim 4, wherein the first shielding unit comprises a ring-shaped first circumferential part that extends in axial direction and in circumferential direction around the rotation axis and is arranged between the stator winding and the rotor.

6. The electrical machine according to claim 5, wherein the second shielding unit comprises a ring-shaped second circumferential part that extends in an axial direction and in circumferential direction and is arranged between the stator winding and the rotor.

7. The electrical machine according to claim 6, wherein the first shielding unit consists of an integrally configured first shielding element and/or wherein the second shielding unit consists of an integrally configured second shielding element.

8. The electrical machine according to claim 7, wherein the first ring part and/or the second ring part comprise through holes arranged with distance to one another in the circumferential direction.

9. The electrical machine according to claim 8, wherein the through holes are arranged approximately aligned in a radial direction radial to the rotation axis relative to a respectively assigned groove, wherein each respectively assigned groove is arranged between two directly adjacent teeth of the winding support.

10. The electrical machine according to claim 1, wherein the first shielding unit is electrically connected with the central body via the first ring part and with earth or the reference potential via the central body and the second shielding unit is electrically connected with the central body via the second ring part and with earth or the reference potential via the central body.

11. The electrical machine according to claim 1, wherein the central body is a cylindrical sleeve or a cylindrical pin.

12. The electrical machine according to claim 1, wherein the first shielding unit comprises a ring-shaped first circumferential part that extends in axial direction and in circumferential direction around the rotation axis and is arranged between the stator winding and the rotor.

13. The electrical machine according to claim 1, wherein the second shielding unit comprises a ring-shaped second circumferential part that extends in an axial direction and in circumferential direction and is arranged between the stator winding and the rotor.

14. The electrical machine according to claim 1, wherein the first shielding unit consists of an integrally configured first shielding element and/or wherein the second shielding unit consists of an integrally configured second shielding element.

15. The electrical machine according to claim 1, wherein the through holes are arranged approximately aligned in a radial direction radial to the rotation axis relative to a respectively assigned groove, wherein each respectively assigned groove is arranged between two directly adjacent teeth of the winding support.

16. The electrical machine according to claim 1, wherein the first ring part and/or the second ring part comprise an outer ring section that extends parallel to a plane orientated orthogonal to the rotation axis.

17. The electrical machine according to claim 1, wherein at least one of the first ring part and the second ring part comprises an inner ring section that extends obliquely relative to the rotation axis.

18. The electrical machine according to claim 1, wherein one inner insulator is arranged between the first bearing and the stator and the second bearing and the stator respectively.

19. The electrical machine according to claim 1, wherein an outer insulator is arranged between the first bearing and the rotor and the second bearing and the rotor respectively.

20. The electrical machine according to claim 1, wherein the air guide part is arranged on a downstream side of the respective one of the through holes with respect to an air flow direction.

21. The electrical machine according to claim 1, wherein the air guide part extends from the first shielding unit or the second shielding unit towards an axially directly adjacent part of the stator.

22. The electrical machine according to claim 1, wherein two through holes of the through holes that are arranged directly adjacent to one another in the circumferential direction are separated from one another by a web of the first ring part or the second ring part, and wherein the air guide part is monolithically connected with the web.

* * * * *